(12) United States Patent
Nehmadi et al.

(10) Patent No.: US 7,962,864 B2
(45) Date of Patent: Jun. 14, 2011

(54) STAGE YIELD PREDICTION

(75) Inventors: Youval Nehmadi, Modiin (IL); Rinat Shimshi, San Jose, CA (US); Vicky Svidenko, San Jose, CA (US); Alexander T. Schwarm, Austin, TX (US); Sundar Jawaharlal, Glen Allen, VA (US)

(73) Assignee: Applied Materials, Inc., Santa Clara, CA (US)

( * ) Notice: Subject to any disclaimer, the term of this patent is extended or adjusted under 35 U.S.C. 154(b) by 420 days.

(21) Appl. No.: 12/154,458

(22) Filed: May 22, 2008

(65) Prior Publication Data

US 2008/0295047 A1  Nov. 27, 2008

Related U.S. Application Data

(60) Provisional application No. 60/931,966, filed on May 24, 2007.

(51) Int. Cl.
*G06F 17/50* (2006.01)
*G06F 19/00* (2006.01)

(52) U.S. Cl. .......................................... 716/51; 700/121
(58) Field of Classification Search .............. 716/50–55; 700/121
See application file for complete search history.

(56) References Cited

U.S. PATENT DOCUMENTS

| | | | |
|---|---|---|---|
| 5,971,586 A | 10/1999 | Mori | |
| 6,311,139 B1 | 10/2001 | Kuroda et al. | |
| 6,389,323 B1 | 5/2002 | Yang et al. | |
| 6,393,602 B1 | 5/2002 | Atchison et al. | |
| 6,496,958 B1 | 12/2002 | Ott et al. | |
| 6,901,564 B2* | 5/2005 | Stine et al. | 716/4 |
| 6,948,141 B1* | 9/2005 | Satya et al. | 716/4 |
| 7,174,521 B2* | 2/2007 | Stine et al. | 716/4 |
| 7,280,945 B1* | 10/2007 | Weiner et al. | 703/2 |
| 7,356,800 B2* | 4/2008 | Stine et al. | 716/21 |
| 7,485,548 B2 | 2/2009 | Deshmukh et al. | |
| 7,570,796 B2 | 8/2009 | Zafar et al. | |
| 7,584,077 B2* | 9/2009 | Bergman Reuter et al. | 703/1 |
| 7,673,262 B2* | 3/2010 | Stine et al. | 716/4 |
| 7,694,244 B2* | 4/2010 | Chan et al. | 716/2 |
| 7,760,347 B2 | 7/2010 | Nehmadi et al. | |
| 2002/0143483 A1 | 10/2002 | Ono et al. | |
| 2006/0269120 A1 | 11/2006 | Nehmadi et al. | |
| 2006/0277506 A1 | 12/2006 | Stine et al. | |
| 2007/0052963 A1 | 3/2007 | Orbon et al. | |
| 2007/0061773 A1* | 3/2007 | Ye et al. | 716/21 |
| 2007/0240085 A1* | 10/2007 | Bickford et al. | 716/4 |
| 2008/0148216 A1* | 6/2008 | Chan et al. | 716/19 |
| 2008/0163140 A1* | 7/2008 | Fouquet et al. | 716/4 |

(Continued)

OTHER PUBLICATIONS

Allan, Gerard A., "EYES User Manual," Predictions Software Ltd, Version 1.3, Nov. 18, 2002, 32 pages.

(Continued)

*Primary Examiner* — Stacy A Whitmore
(74) *Attorney, Agent, or Firm* — Blakely, Sokoloff, Taylor & Zafman LLP

(57) ABSTRACT

In one embodiment, a method for predicting yield during the design stage includes receiving defectivity data identifying defects associated with previous wafer designs, and dividing the defects into systematic defects and random defects. For each design layout of a new wafer design, yield is predicted separately for the systematic defects and the random defects. A combined yield is then calculated based on the yield predicted for the systematic defects and the yield predicted for the random defects.

21 Claims, 10 Drawing Sheets

U.S. PATENT DOCUMENTS

2008/0294281 A1 11/2008 Shimshi et al.
2008/0295048 A1 11/2008 Nehmadi et al.

OTHER PUBLICATIONS

Allan, Gerard A., "PEYE-CAA User Manual," Predictions Software Ltd, Sep. 1, 2003, 17 pages.

Barberan, Sandrine, et al., "Management of Critical Areas and Defectivity Data for Yield Trend Modeling," Department of Device Engineering, STMicroelectronics-Central R&D, Crolles-France, Nov. 1998, 9 pages.

Levasseru, Sandra, et al., "Application of a Yield Model Merging Critical Areas and Defectivity Data to Industrial Products," Defect and Fault Tolerance in VLSI Systems, Proceedings, 1997 IEEE International Symposium on Oct. 1997, pp. 11-19.

Svidenko, Vicky et al. "Dynamic Defect-Limited Yield Prediction by Criticality Factor," ISSM Paper: YE-O-157, 2007.

U.S. Appl. No. 12/154,459, Office Action dated Jun. 18, 2010.

\* cited by examiner

STAGE YIELD PREDICTION

RELATED APPLICATION

The present application claims priority to U.S. Provisional Application Ser. No. 60/931,966, filed May 24, 2007, which is incorporated herein in its entirety.

FIELD OF THE INVENTION

The present invention relates to product yield prediction and analysis, and more specifically to design stage yield prediction.

BACKGROUND OF THE INVENTION

The fabrication of integrated circuits is an extremely complex process that may involve hundreds of individual operations. In view of the device and interconnect densities required in present day integrated circuits, it is imperative that the manufacturing processes be carried out with utmost precision and in a way that minimizes defects. For reliable operation, the electrical characteristics of the circuits must be kept within carefully controlled limits, which imply a high degree of control over the myriad of operations and fabrication processes. For example, in the photoresist and photomask operations, the presence of contaminants such as dust, minute scratches and other imperfections in the patterns on the photomasks can produce defective patterns on the semiconductor wafers, resulting in defective integrated circuits. Further, defects can be introduced in the circuits during the diffusion operations themselves.

The figure of merit of a semiconductor manufacturing facility is the sort yield obtained by electrically probing the completed devices. However, due to the multitude and complexity of process steps and their associated cost, it is desirable to detect problems early in the design phase in order to correct them, and to predict the yield in order to plan, during the manufacturing phase, wafer starts appropriately. Currently, designers use yield prediction software to decide which design layout alternative will produce a better yield, and thus be printed, and to decide how many wafers to put inline, i.e., adjust the number of wafer starts for production per product based on real inline data to meet the yielding die commitments.

During the design phase, existing software predicts yield based on the wafer design and fabrication defect data using a statistical critical area calculation. The problem with the existing yield prediction software lies in the hidden assumption that the defect distribution is random over the die and the likelihood of a defect to occur on different design elements is the same. With older technology nodes (90 nm and above), where most of the defects were actual random defects, these assumptions could hold true. However, with new technology nodes, where the number of systematic defects, i.e., defects due to non-random errors that are conditioned by the specifics of a design layout or the equipment, has increased significantly, the typical yield prediction software still distributes the defects randomly, even though the defects may occur in specific design elements.

During the manufacturing phase, one way to plan wafer starts appropriately is by utilizing inline inspection tools to detect process defects on the wafers in process. These tools are typically optical microscopes, but of late electron-beam inspection tools have been introduced for certain critical layers. The defects detected by inspection tools are referred to as 'visual defects'. Not all visual defects will cause an electrical fail. Conversely, not all yield loss can be attributed to visual defects. It has been a goal in the industry to be able to predict the yield loss due to visual defects. The methodology most commonly used is the Kill Ratio method that empirically deduces the fail probabilities of different defect classes by overlaying inline defects with sorted yield data. It is performed on an initial training set, and then applied to wafers in process. This method either requires significant manual classification for the learning set or relies on inspection tool classification that typically has low accuracy and purity. In addition, when new defect classes arise, the learning phase has to be repeated.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
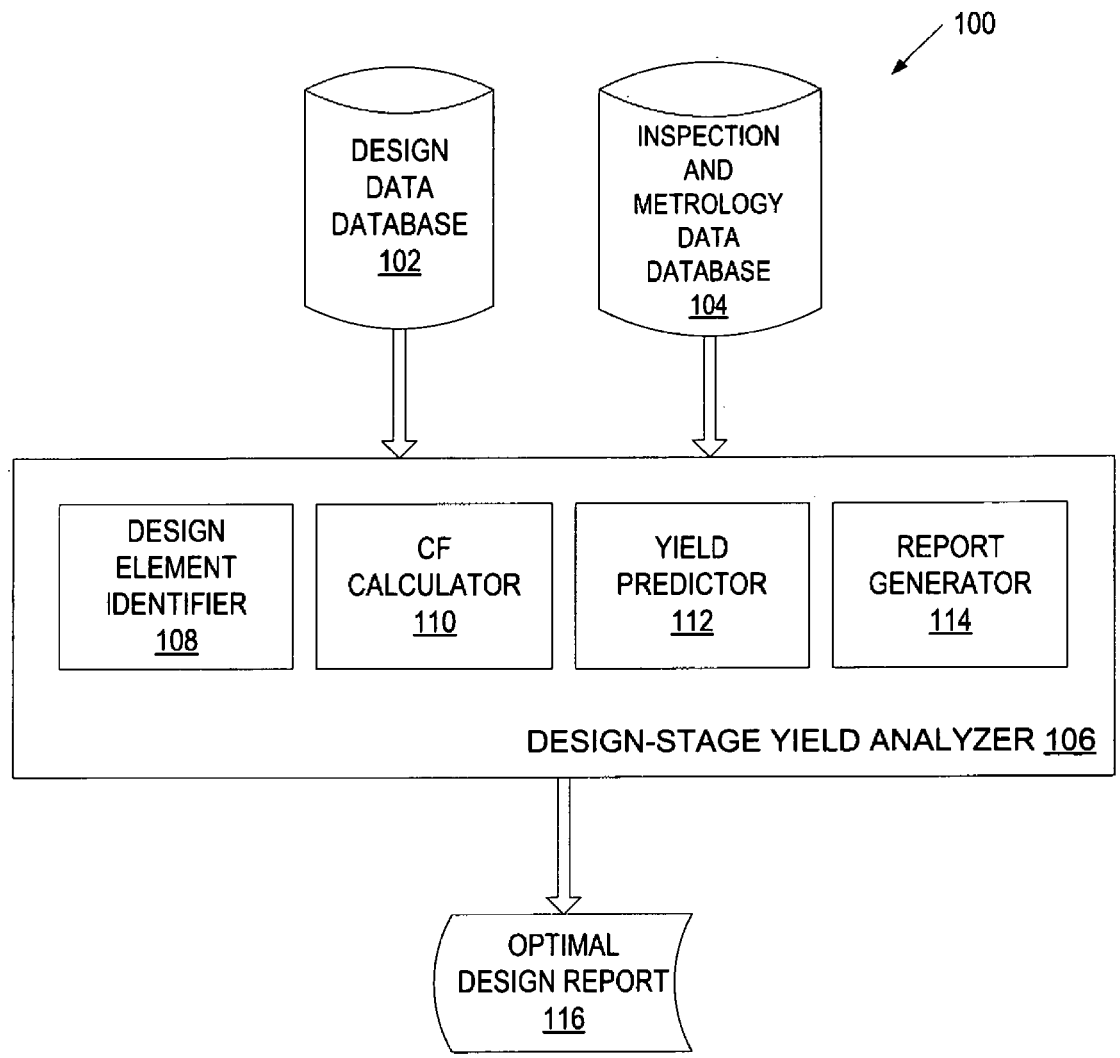
FIG. 1 is a block diagram of one embodiment of a design stage yield improvement system.

Embodiments of the invention provide a method and apparatus for predicting yield during the design stage. Using inspection data identifying defects associated with previous wafer designs (i.e., existing wafer designs previously used), defects are divided into systematic defects and random defects. For each design layout, yield is predicted separately for the systematic defects and random defects. A designer can then use the combined yield to select an optimal new design layout.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

FIG. 1 is a block diagram of one embodiment of a design stage yield improvement system 100. The system 100 includes a design data database 102, an inspection and metrology data database 104, and a design-stage yield analyzer 106. The design-stage yield analyzer 106 may reside on the same computer as the databases 102 and 104. Alternatively, one or both of these databases 102 and 104 may reside on different machines and may be accessed by the design-stage yield analyzer 106 via a network (e.g., a private network or a public network).

A wafer may be produced according to a design via a fabrication process controlled by a set of process parameters. The design data database 102 may store design data for previous wafer designs ("previous designs") and for new wafer designs ("new designs"). The design data for the wafer designs may include the design layout, the routing information for the design layout, etc.

During the fabrication process, due to various factors, the wafers may not be formed to exactly match the design. Hence, to determine how the actual wafers vary from the design, one or more wafers undergo an inspection process at various steps during the fabrication process. The inspection process may be performed using any suitable inspection system, such as an UVision™ inspection system available from Applied Materials®. In some cases, the inspection process may be a separate process, and in other cases, it may be performed in conjunction (inline) with the fabrication process. As part of the inspection process, defects in the wafers are identified and defectivity information, such as the size of defects, the volume of defects, the location of defects within the designs on which the defects were found, etc., is collected. The inspection and metrology data database 104 stores the defectivity information for the previous wafer designs. The information stored for the previous designs may then be used in determining and evaluating the yield of new wafer designs.

Once a new integrated circuit functional design is developed, there are multiple ways to implement it. Designers may vary the placement of active and passive elements, routing between elements, routing and element shape, etc. Thus, each variation may result in a different design layout for the new design. Hence, a new design may have multiple new design layouts. In turn, each of these new design layouts may produce a different yield. Since no inspection and metrology data has yet been gathered for the new design, the yield for each of the new design layouts may be deduced from the data stored for the previous designs. Using the stored design data for previous designs and the stored inspection and metrology data for the previous designs, the design-stage yield analyzer 106 predicts the yield for each of the new design layouts.

The design-stage yield analyzer 106 correlates the previous design layouts to the new design layouts. With this correlation, the design-stage yield analyzer 106 may predict the yield for each of the new design layouts. Based on these predicted yields for the new design layouts, the design-stage yield analyzer 106 may generate a report specifying an optimal design layout for a new design.

The design-stage yield analyzer 106 may include a design element identifier 108, a criticality factor calculator 110, a yield predictor 112, and a report generator 114. The design element identifier 108 divides previous design layouts into design elements, and determines a design/defect interaction for each design element. A design/defect interaction is the relationship between design elements and defects attributed to those design elements. It specifies which defects are likely to occur for a specific design element. In one embodiment, design elements are defined by line and/or component density. In a further embodiment, the design element identifier 108 includes a pattern density calculator (not shown) that calculates the pattern density of the design elements using geometric characteristics and design data obtained from design data database 102. Design element identifier 108 may also receive pattern density and/or design/defect interaction information for previous designs, e.g., from inspection and metrology data database 104 and/or a pattern density reporter (not shown). In other embodiments, design elements may be defined by other parameters, such as routing pattern, line and component shape, etc.

The yield predictor 112 predicts yield for each design layout using the design/defect interaction associated with relevant design elements. In particular, for each design layout, the yield predictor 112 identifies defects associated with relevant design elements and divides these defects into systematic and random defects. Random defects are attributed to contamination of a wafer, whereas, systematic defects are due to non-random errors and are conditioned by the specifics of a design layout or the equipment.

Subsequently, the yield predictor 112 predicts yield separately for the systematic and random defects, and calculates a combined yield based on the two predicted yields. As to random defects, the yield predictor 112 calculates yield based on a criticality factor (CF) of individual defects which may be calculated by the CF calculator 110. The CF indicates whether a defect is likely to be a nuisance defect, or alternatively is likely to have a significant impact on yield. In particular, the CF represents a probability of a defect with a certain size or volume to kill a device. The CF may be calculated based on the size or volume of the defect and the layout of the design on which the defect is found. One embodiment of a method for calculating the CF will be discussed in more detail below in conjunction with FIG. 4.

The report generator 114, using the predicted yield of the previous design layouts and the correlation between the previous designs layouts to new design layouts, may generate an optimal design report 116 specifying an optimal design layout for a new design.

Figure 2A:
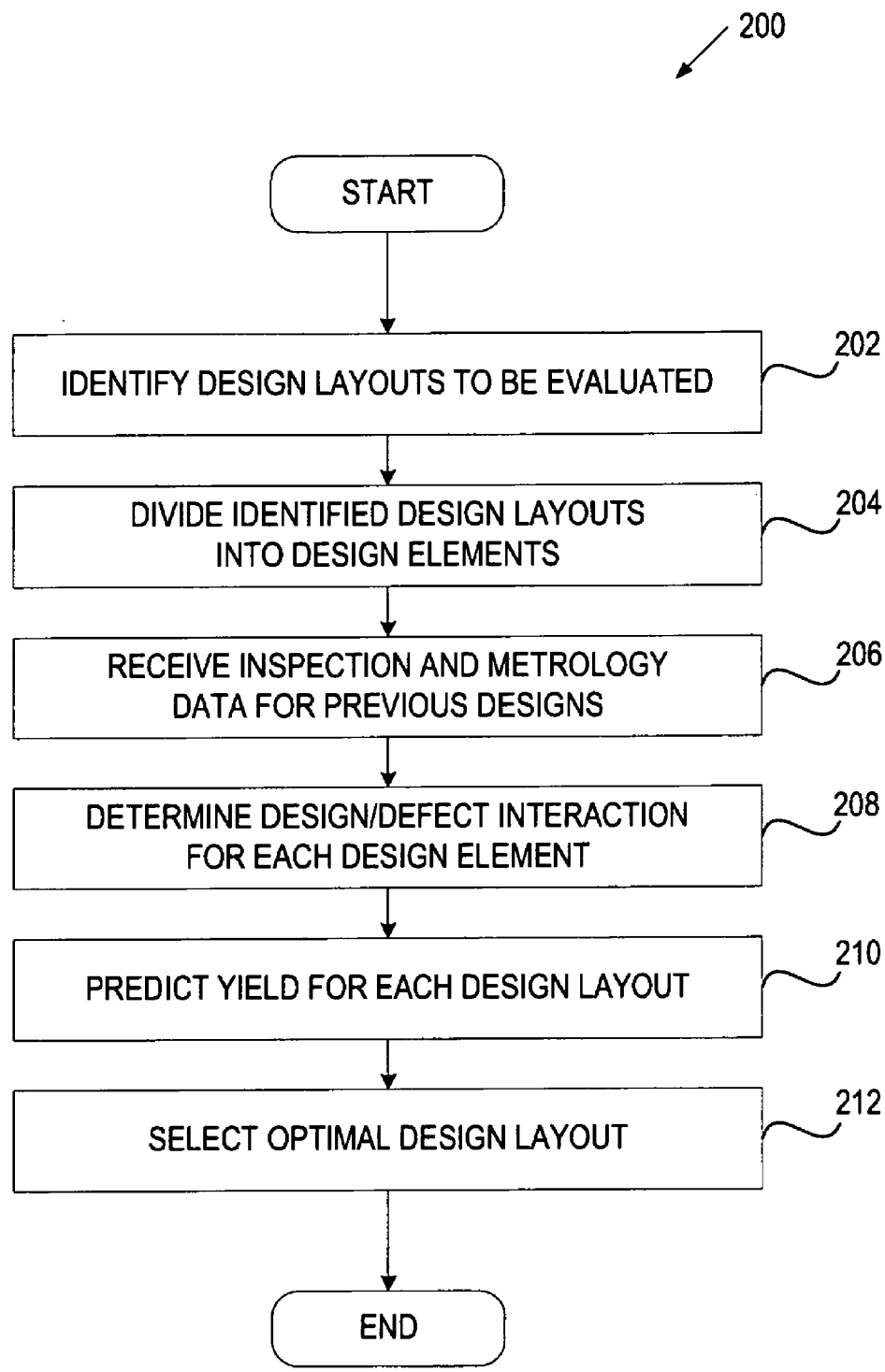
FIG. 2A is a flow diagram of one embodiment of a method for predicting yield during the design stage.

FIG. 2A is a flow diagram of one embodiment of a method 200 for predicting yield during the design stage. The method may be performed by processing logic that may comprise hardware (e.g., circuitry, dedicated logic, programmable logic, microcode, etc.), software (such as instructions run on a processing device), or a combination thereof. In one embodiment, method 200 is performed by the design stage yield improvement system 100 of FIG. 1.

For each new product, the yield loss for each of the new design layouts is evaluated. A comparison of the yield loss amongst the new design layouts enables designers to determine which new design layout alternative produces the best yield. With this information, designers can then decide which new design layout alternative to implement.

At block 202, new design layouts to be evaluated are identified, and design data for those new design layouts is received. The design data may include the placement of active and passive elements, routing between elements, routing and element shape, etc.

At block 204, the identified new design layouts are divided into design elements. In one embodiment, the design elements are determined according to pattern density. An exemplary pattern density calculation algorithm is discussed in more detail below with reference to FIG. 5. In other embodiments, design elements may be determined according to parameters other than pattern density (e.g., component shape, etc.).

At block 206, defectivity data, for example, the inspection and metrology data gathered from inspections performed on previous designs is received. The inspection and metrology data may include geometric characteristics of individual defects. In one embodiment, the inspection and metrology data is associated with distinct design elements of the previous designs.

At block 208, a design/defect interaction is determined for each design element of a new design layout. As earlier noted, the design/defect interaction is a relationship between design elements and defects that specifies which defects are likely to occur for a specific design element. Since the new wafer design has not yet been through the fabrication process, defectivity data for the new design is not available for determining the design/defect interaction for each of the new design elements. Thus, the design/defect interaction for the new design is predicted by using the defectivity data stored in the inspection and metrology data database for the previous wafer designs. The design elements of the previous designs are correlated to the equivalent design elements in the new design layouts. The inspection and metrology data associated with the design elements of the previous designs is then associated with the equivalent design elements in the new design layouts. This correlation results in a determination of the design/defect interaction for each design element of the new design, despite the new design's lack of defectivity data.

At block 210, yield is predicted for each new design layout using the design/defect interaction information for the relevant design elements. One embodiment of a yield prediction method will be discussed in more detail below in conjunction with FIG. 2B.

At block 212, an optimal new design layout is selected based on yields predicted for the different new design layouts.

Figure 2B:
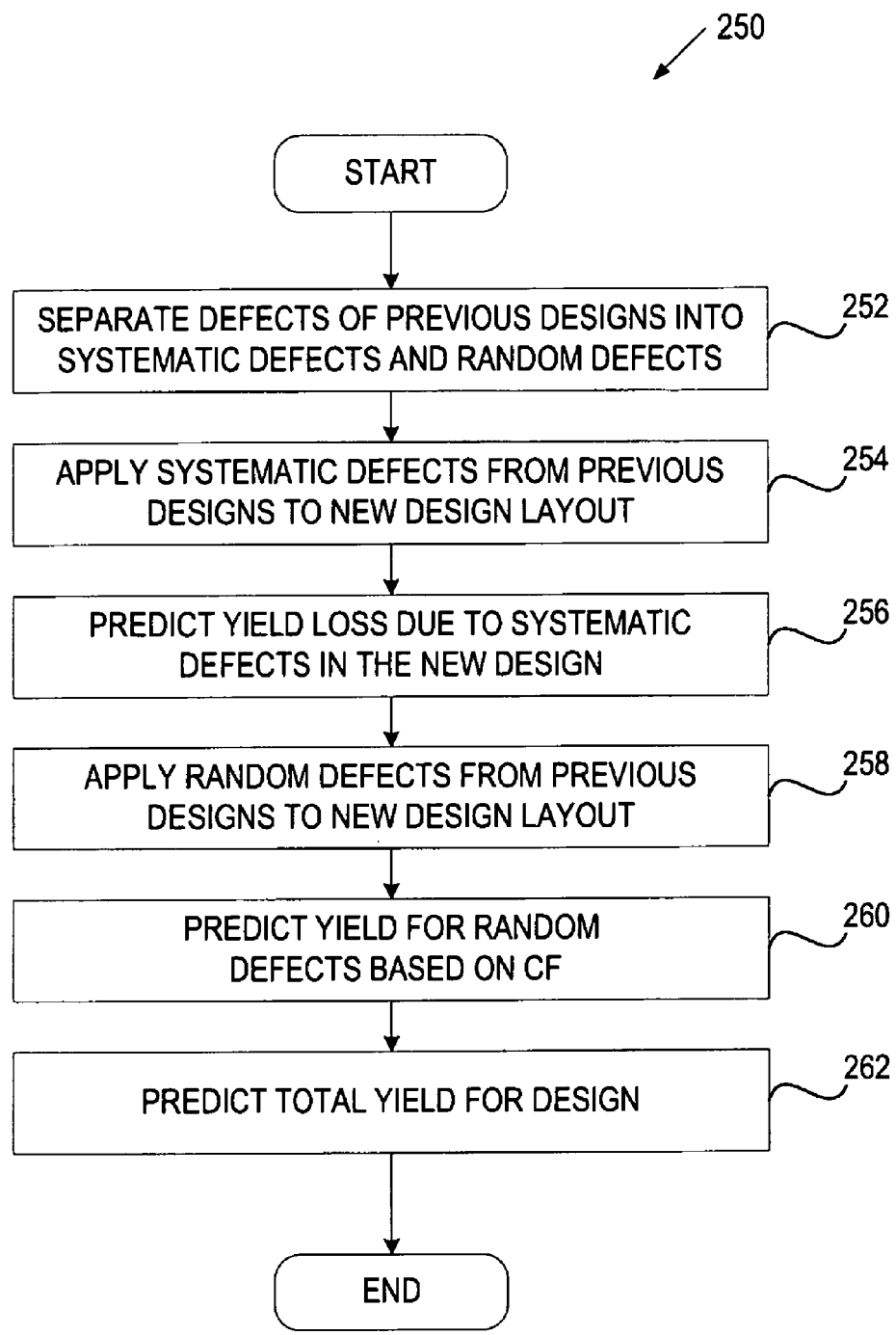
FIG. 2B is a flow diagram of one embodiment of a method for processing systematic and random defects.

FIG. 2B is a flow diagram of one embodiment of a method 250 for predicting yield loss due to systematic and random defects. The method may be performed by processing logic that may comprise hardware (e.g., circuitry, dedicated logic, programmable logic, microcode, etc.), software (such as instructions run on a processing device), or a combination thereof. In one embodiment, method 250 is performed by the design stage yield improvement system 100 of FIG. 1.

At block 252, defects associated with design elements of previous designs are divided into systematic defects and random defects. As earlier noted, the problem with the existing yield prediction software is the hidden assumption that the defect distribution is random over the die and the likelihood of a defect to occur on different design elements is the same. With new technology nodes, where the number of systematic defects, i.e., defects conditioned by the specifics of a design layout or the equipment, has increased significantly, the typical yield prediction software still distributes the defects randomly, even though the defects may occur in specific design elements. Thus, defects are separated as systematic and random defects to account for the likelihood of the systematic defects occurring in specific design elements.

Defects may be categorized into "bins." In one embodiment, using Design Based Binning (DBB), defects in fabrications of a wafer may be categorized as either systematic or random defects. In a patent application entitled "Design-Based Method for Grouping Systematic Defects in Lithography Pattern Writing System," publication number US20060269120A1, incorporated herein by reference, a method for grouping defects is described. The systematic defects of previous designs may include the defects that fall into those bins that have a number of defects above a predefined threshold, and the random defects of previous designs may include the defects that fall into those bins that have a number of defects below a predefined threshold. An exemplary separation of the defects into systematic and random is illustrated in FIG. 2C, in accordance with one embodiment of the invention.

Figure 2C:
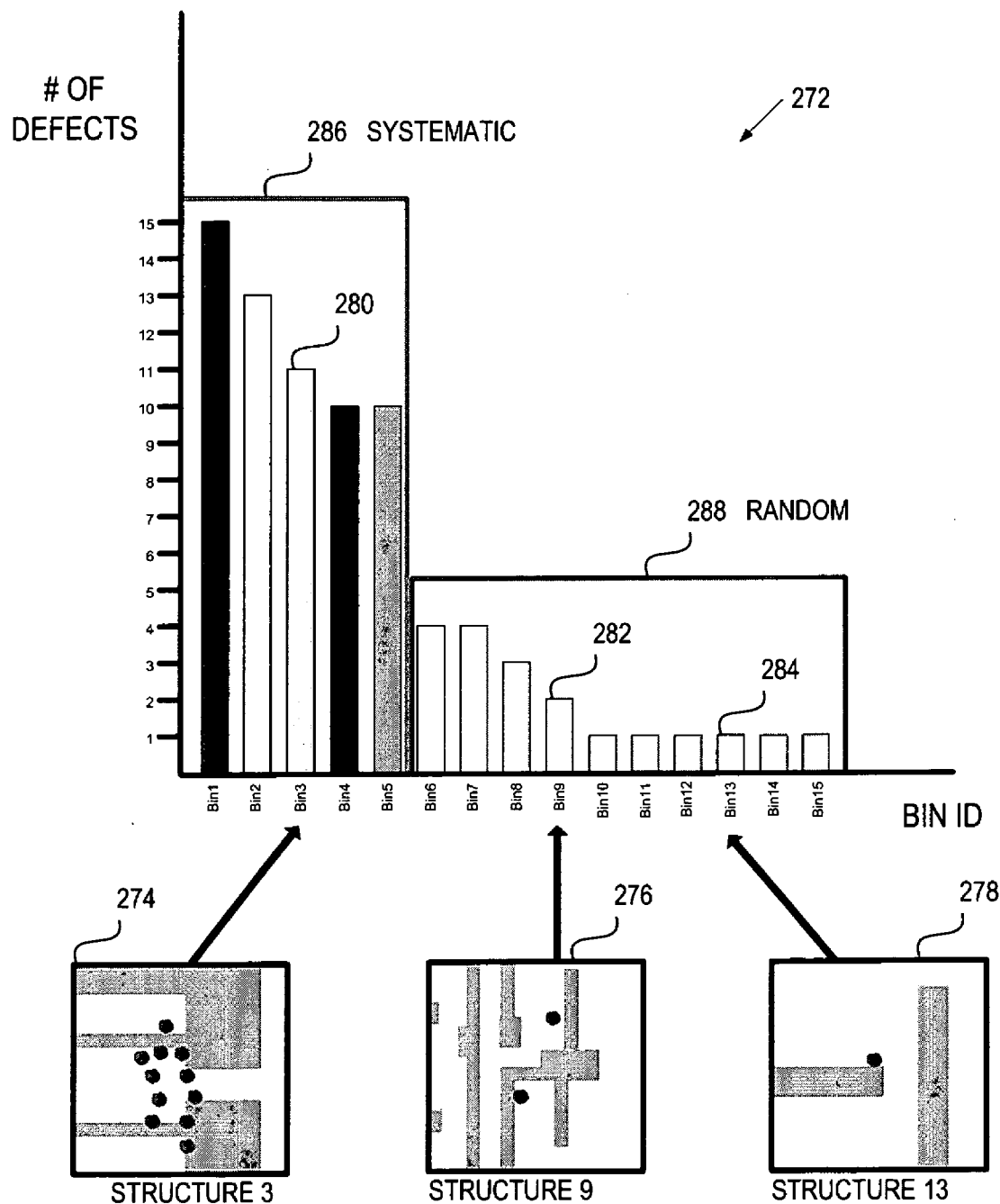
FIG. 2C illustrates an exemplary defect size distribution per design-sensitivity bin, in accordance with one embodiment of the invention.

FIG. 2C illustrates grouping defects based on design-based binning in accordance with one embodiment of the invention. Design-based binning is the grouping of defects based on a defect's location on a wafer and relation to design elements (device structures). The location of the defects is determined on a wafer. In one embodiment, a defect map and CAD model are aligned to correlate a defect's position relative to a structure in the design. As previously described, due to the repetitive nature of typical device layouts, a systematic defect mechanism will typically trigger multiple defects on various locations across a die (as well as across common location on multiple dice on a wafer). By analyzing the layout in the neighborhood (the design layout in the area surrounding the defect) of the defect, and matching it to similar defected neighborhoods in different location across the die, defects may be categorized into design bins by common structures in which they occur. A device structure is an individual logic cell or larger block that performs a specific electrical function. During fabrication, a lithography system may form the desired structures on a wafer.

For example, area "clips" can be generated from the CAD model for the areas surrounding each defect. A clip may be a rectangle of a predetermined size centered on the defect. The clips are compared to one another to identify matching structural elements. For example, if two clips can be aligned, they are added to the same structural defect bin. By categorizing defects into structural bins, it is thus possible to track the number of defects associated with each corresponding structure.

For example, as illustrated in FIG. 2C, there are fifteen design bins, where each design bin represents the number of defects associated to a particular device structure. In one embodiment, each design bin is normalized by the occurrence of its design element in the entire layout. In one embodiment, a bin size threshold is set, above which defects can be classified as systematic and may be excluded from the CF calculations. The bin size may be the number of defects in a bin.

Graph 272 in FIG. 2C depicts the number of defects in a plurality of bins in accordance with embodiments of the present invention. As seen, three structures, Structure 3 (274), Structure 9 (276), and Structure 13 (278) are illustrated to facilitate understanding. In illustration 274, eleven defects are associated with the same structure, Structure 3. Illustration 274 depicts an alignment of the clips of each of the eleven defects associated Structure 3. Structure 3 (274) is given Bin ID "Bin 3" in graph 272 and corresponds to bar graph 280. Similarly, two defects, as seen in Structure 9, are binned together forming Bin 9, illustrated by bar graph 282. Illustration 276 depicts an alignment of the clips of each of the two defects assigned to Structure 9. As seen in illustration 278, one defect is associated to Structure 13. Bar graph 284 represents the one defect assigned to Bin 13.

As seen in the low number of defects assigned to Bin 6 to Bin 15, random defects will generally not group. However, as seen in the high number of defects assigned to Bin 1 to Bin 5, systematic defects will group. Each bin may be normalized by the occurrence of its design element in the entire layout. In one embodiment, a bin size threshold is set, where the number of defects in a bin greater than the threshold may classify the defects as systematic defects, as illustrated by grouping 286. For example, this threshold can be arrived at by calculating the random probability of the given defects to land on a given structure, taking into account the prevalence of that structure in the entire design, the defect count and the die dimensions. In one embodiment, random defects are defects grouped into design-based bins where the number of defects in each bin is less than the bin size threshold, as illustrated by grouping 288. Using this method inspection defects can be classified as random defects or systematic defects.

Returning to FIG. 2B, at block 254, systematic defects (e.g., defects grouped into design-based bins where the number of defects in each bin is greater than a predefined threshold) from the previous design layouts are applied to a new design layout. Since systematic defects are due to non-random errors and are conditioned by the specifics of a design layout or the equipment, e.g., defects attributed to under-etching a via or collapsing a photo-resist pattern, systematic defects are strongly dependent on the relationship between design features and process parameters. As a consequence, systematic defects will occur in a very specific location or locations. Thus, systematic defects from previous design layouts can directly correlate to new design layouts.

Such known systematic bin information may be stored in at least one of the design data database and the inspection and metrology data database. In one embodiment, the design layouts (hence, the design elements) of systematic bins identified in previous product(s) are searched for in the new design layouts. If layouts of systematic bins identified in previous product(s) are found in the new design layout, the appropriate fail probability data may be applied to the new design layout (hence, the new design element).

At block 256, the yield-loss due to systematic defects in the new design is predicted. It may be inferred that the predicted fail probability of systematic defects for specific design elements in the new design layout will be approximately the same as the fail probability of systematic defects for those same design elements in the previous design layouts.

As earlier described at block 252, the defects for the previous designs were separated into systematic defects and random defects. During the separation process, systematic defects were classified to a certain design-based bin. Each of the design-based bins for systematic defects of previous designs is associated with a yield impact that may be calculated using one of two methods:

1. Using a SEM (scanning electron microscope) review tool, a tool that enables engineers to image and classify defects, and manual classification of a significant sample of defects from that bin, a trained defect engineer is likely to predict, from a SEM image, if a defect will cause a failure or not, and aggregating the classification results arrive at a fail probability for that bin.
2. Selecting a subset of dies that have only this class of defects at the relevant layer (and no defects in other layers), and obtaining their fail probability from sort yield.

Thus, the yield impact value for these design-based bins may be applied to appropriate design elements in the new design layout. The yield loss caused by the systematically-failing structures can therefore be determined, factoring in the relative prevalence of these structures between the new design and the previous designs. The yield loss information for each design-based bin can be combined to determine total yield loss for the new design layout caused by systematic defects.

At block 258, random defects (e.g., defects grouped into design-based bins where the number of defects in each bin is less than a predefined threshold) from the previous designs are applied to a new design layout. Such known random defect information may be stored in at least one of the design data database and the inspection and metrology data database.

At block 260, yield is predicted for the random defects. One embodiment of a method for predicting yield for the random defects will be discussed in more detail below in conjunction with FIG. 3A.

At block 262, a total yield is predicted for the design layout using the following exemplary expression:

$$\text{Yield} = \text{Yield\_random} * \text{Yield\_systematic}.$$

Method 250 may be repeated for each design layout of a new design. The design layout with the highest yield may then be chosen.

Figure 3A:
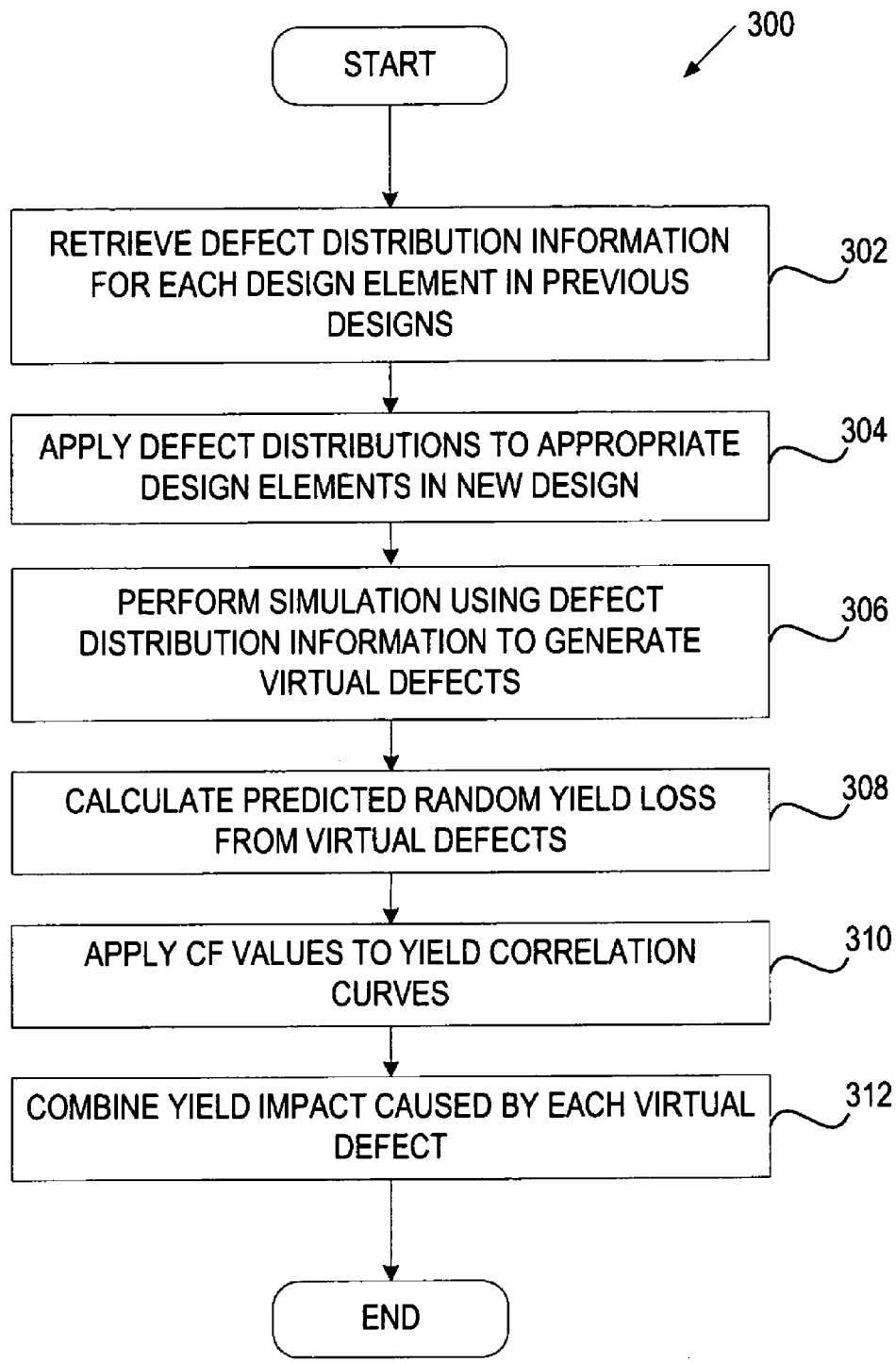
FIG. 3A illustrates a flow diagram of one embodiment for a method of predicting yield loss due to random defects for a critical layer of a design layout.

FIG. 3A illustrates a flow diagram of one embodiment for a method 300 of predicting yield loss due to random defects for a critical layer of a design layout. The method may be performed by processing logic that may comprise hardware (e.g., circuitry, dedicated logic, programmable logic, microcode, etc.), software (such as instructions run on a processing device), or a combination thereof. In one embodiment, method 300 is performed by the design stage yield improvement system 100 of FIG. 1.

To accurately predict the total yield loss due to random defects, method 300 is repeated for each critical layer of the design layout.

Figure 3B:
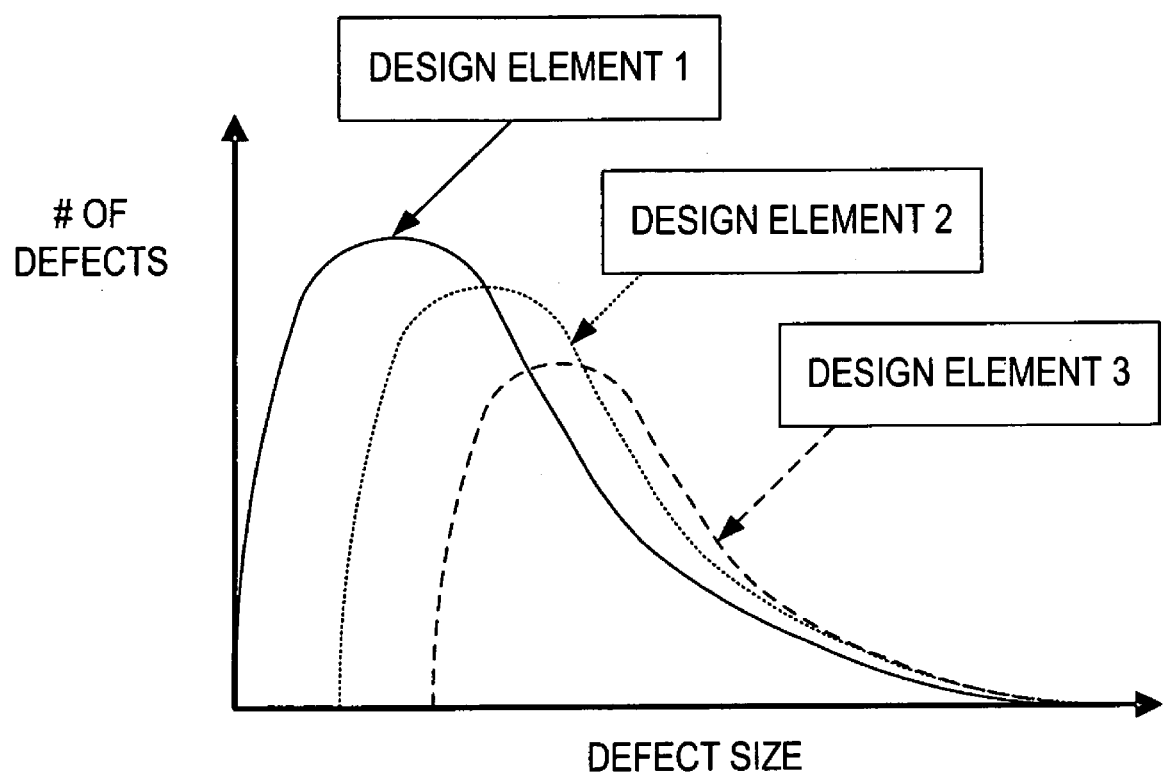
FIG. 3B illustrates exemplary defect distribution information shown in the form of a graph, in accordance with one embodiment of the invention.

At block 302, random defect distribution information is retrieved for each design element in the previous designs. Defect distribution information indicates the number of defects of each defect size that are likely to occur at a particular design element. The random defect distribution information may be retrieved from an inspection and metrology data database and/or a design data database. Exemplary defect distribution information is shown in the form of a graph in FIG. 3B, in accordance with one embodiment of the invention.

Returning to FIG. 3A, at block 304 the defect distribution information is applied to appropriate design elements in the new design. For example, if a particular design element in a previous design is shown to have a defect distribution "A," then defect distribution A may be applied to the same particular design element where it appears in the new design.

At block 306, a simulation is performed using the defect distribution information to generate virtual defects on the new design for each design element. As earlier noted, since the new wafer design has not yet been through the fabrication process, defectivity data for the new design is not available. As such, a simulation, e.g., a Monte Carlo simulation, is performed to generate virtual random defects for the new design. The simulation produces random defectivity data that accurately reflects real process conditions.

At block 308, the CF values are calculated for the virtual random defects. The CF values may be calculated for each virtual defect using geometric characteristics of the defect (e.g., its size or volume) and relevant design data (e.g., line and component density). One embodiment of a CF calculation algorithm will be discussed in more detail below in conjunction with FIG. 4.

Figure 3C:
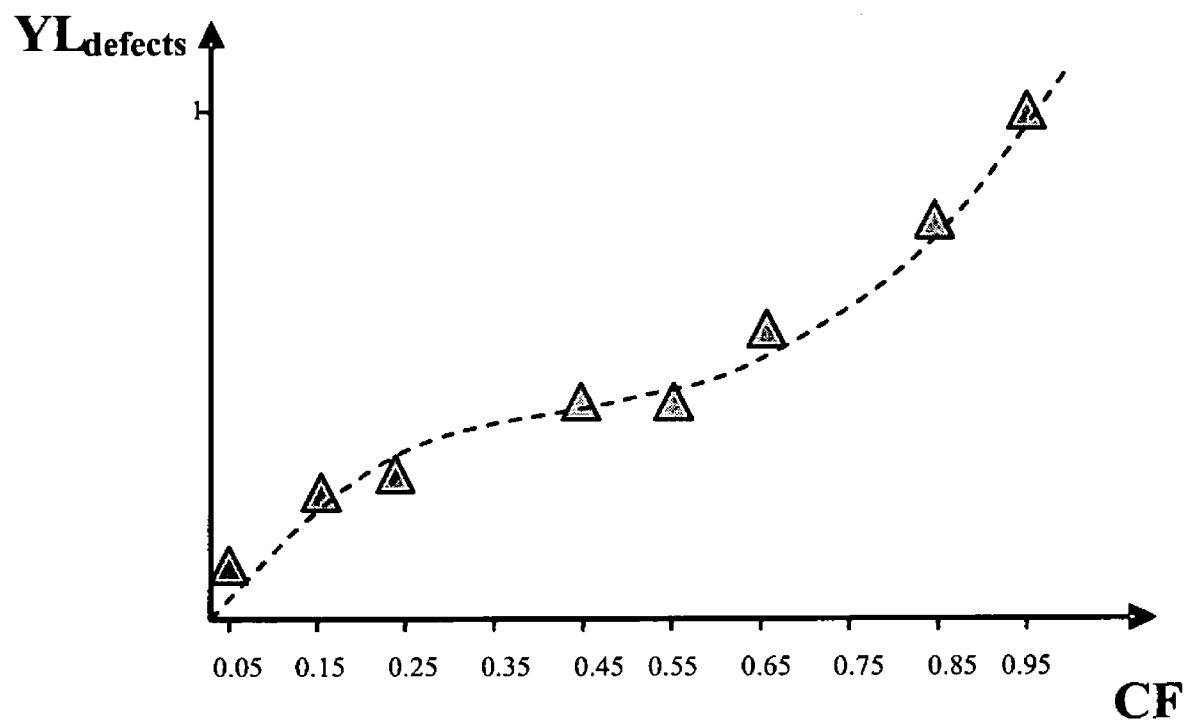
FIG. 3C illustrates an exemplary yield correlation curve, in accordance with one embodiment of the invention.

Returning to FIG. 3A, at block 310, the CF values of the virtual random defects are applied to yield correlation curves that are imported from previous designs. Yield correlation curves correlate yield impact to a CF such that if a CF for a defect is known, the yield impact caused by the virtual random defect can be determined. An exemplary yield correlation curve is illustrated in FIG. 3C, in accordance with one embodiment of the invention.

Returning to FIG. 3A, each previous design may include a separate yield correlation curve for each of its critical layers. A yield correlation curve for a critical layer of a previous design may be imported to a new design, and used to predict yield impact due to defects at a corresponding critical layer of the new design. Therefore, yield impacts for the virtual random defects can be predicted by applying the CF of virtual defects to the yield correlation curve. In one embodiment, a correlation curve of a critical layer for a previous design that most closely matches the new design at the particular critical layer is used. Alternatively, correlation curves for the critical layer from other previous designs may be used.

At block 312, the yield impact caused by each of the virtual random defects is combined to determine the yield impact for a critical layer caused by random defects.

Method 300 may be repeated for each critical layer of a new design layout to determine the yield impact caused by random defects to that critical layer.

As a result, the random defect yield impact data may be combined to determine the total yield impact caused by random errors.

An exemplary CF calculation algorithm will now be discussed in more detail with reference to FIG. 4. The algorithm determines a probability of the defect to cause a killer failure of the device based on geometric considerations such as a likelihood of the defect to bridge two lines (cause a shorting failure) and a likelihood of the defect to open a line (cause an open failure).

Figure 4:
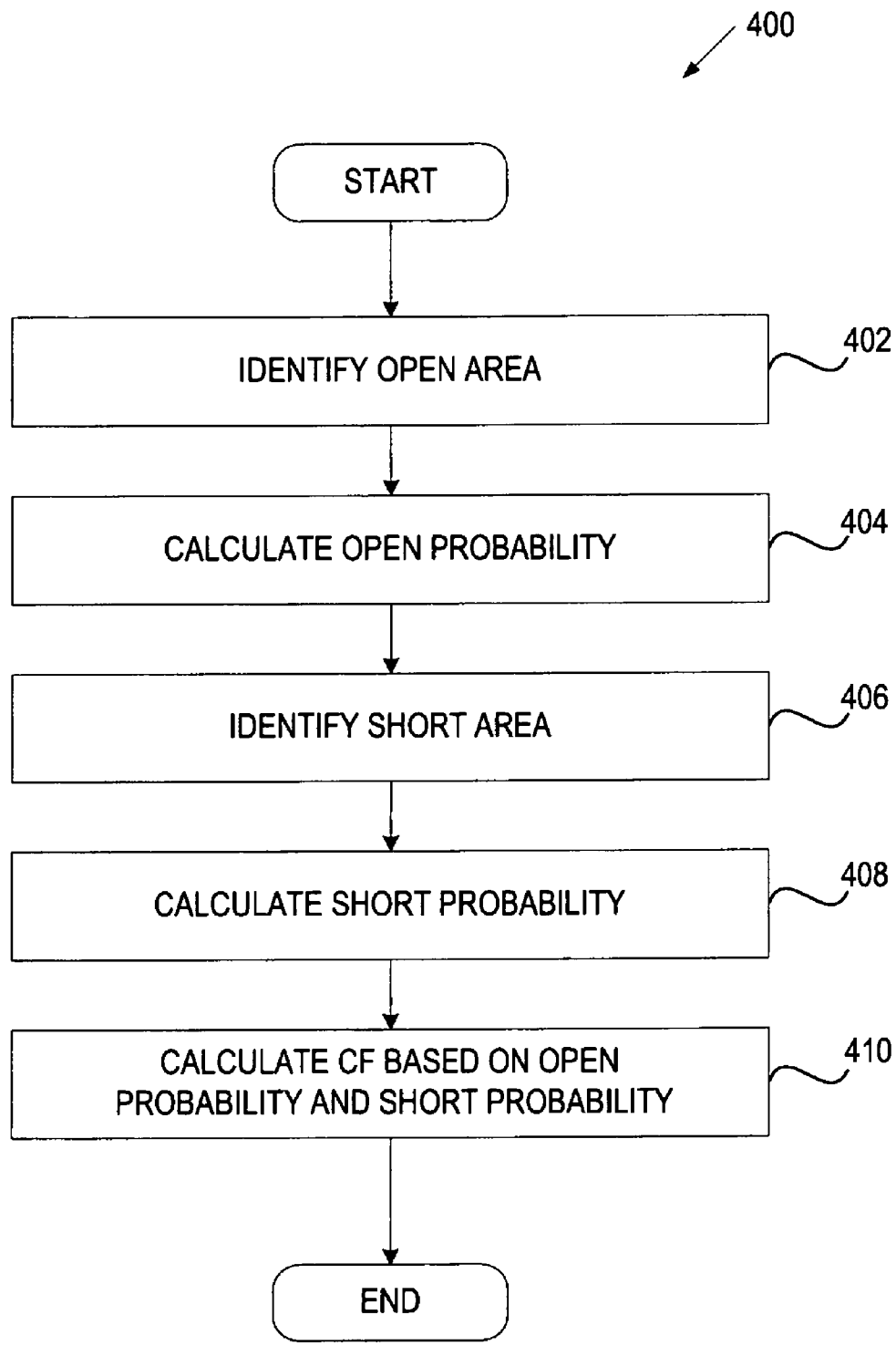
FIG. 4 is a flow diagram of one embodiment of a method for calculating a defect criticality factor.

Referring to FIG. 4, an open area is identified (block 402) and a probability of the defect to cause an open failure (open probability) is calculated (block 404). The open area is the total area of all locations inside the design layout area, in which the defect would cause an opening failure. Open probability may be calculated as a ratio between the open area and the entire design layout area.

At block 406, a short area is identified. The short area is the total area of all locations inside the design layout area, in which the defect would cause a shorting failure. At block 408, a probability of the defect to cause a shorting failure (short probability) is calculated. Short probability may be calculated as a ratio between the short area and the entire design layout area.

At block 410, a CF is calculated as a kill ratio of the defect considering both open probability and short probability. For example, the CF can be calculated using the following expression:

$$CF = 1-(1-Ps) \times (1-Po),$$ where Ps is the short probability and Po is the open probability used to calculate Cf, the criticality factor.

Figure 5:
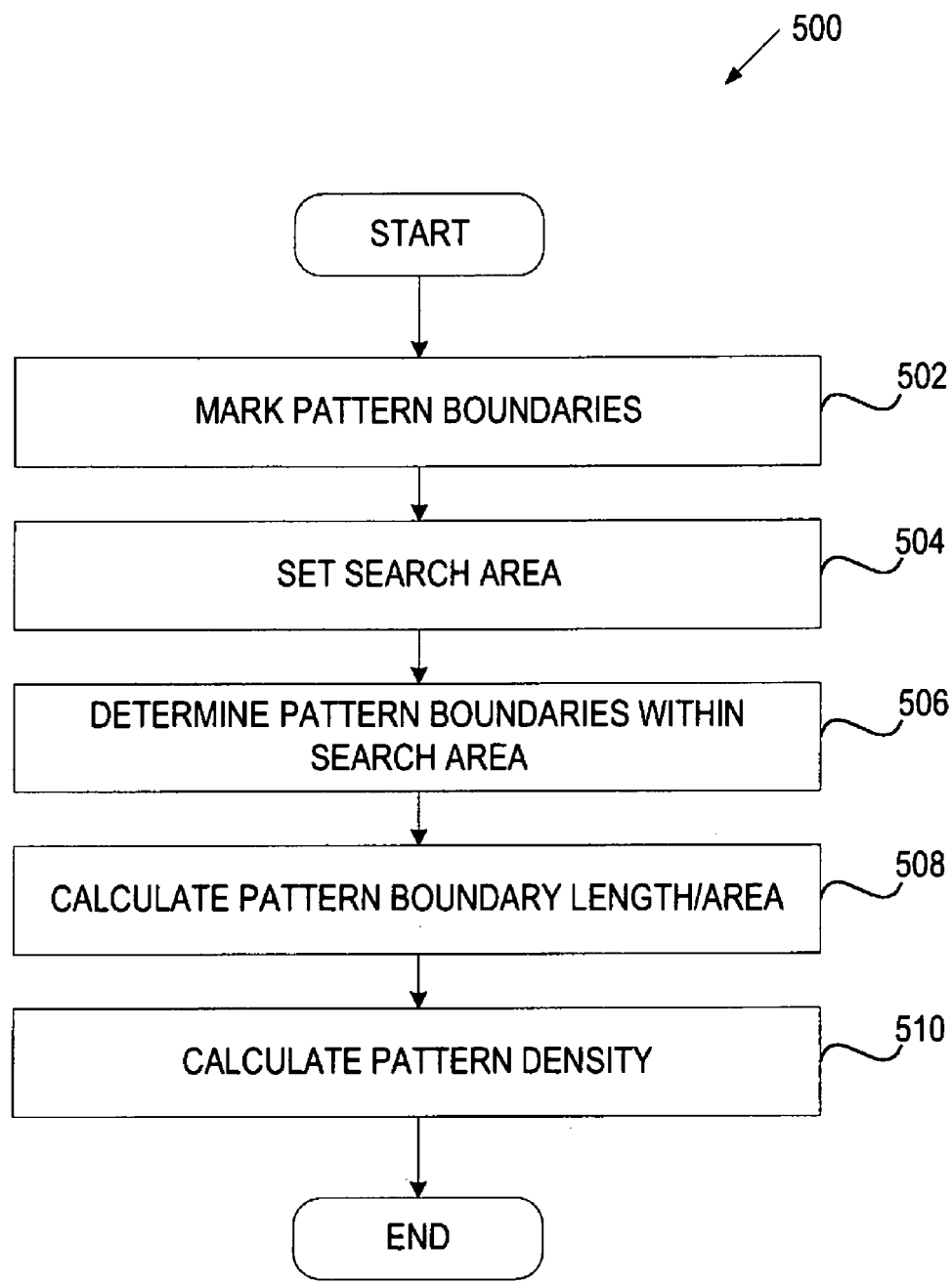
FIG. 5 is a flow diagram of one embodiment for method of calculating pattern density.

FIG. 5 is a flow diagram of one embodiment for method 500 of calculating pattern density. The method may be performed by processing logic that may comprise hardware (e.g., circuitry, dedicated logic, programmable logic, microcode, etc.), software (such as instructions run on a processing device), or a combination thereof. In one embodiment, method 500 is performed by the design stage yield improvement system 100 of FIG. 1.

As earlier described, new design layouts are divided into design elements. In one embodiment, the design elements are determined according to pattern density. At block 502, pattern boundaries are marked. In one embodiment, pattern boundaries include the perimeters of all active components, passive components, routing (traces) etc. within an information area (e.g., the visible area of a Graphic Data System ("GDS") clip). Alternatively, pattern boundaries may include the area of such components and traces.

At block 504, a search area is set. The search area is a subset of the information area that is considered when determining pattern density of a design element. In one embodiment, the design element has a perimeter that is the size of, or smaller than, the search area.

At block 506, the pattern boundaries within the search area are determined. At block 508, in one embodiment, a pattern boundary length is calculated. The pattern boundary length is the total length of pattern boundaries within the search area Alternatively, in one embodiment, a pattern boundary area (total area of the pattern boundaries within the search area) may be determined. In order to avoid edge effects, initial analysis may be performed on the pattern boundaries within the information area, while a final analysis may be performed on pattern boundaries within the search area.

At block 510, pattern density is calculated. In one embodiment, pattern density is calculated by determining a ratio between the pattern boundary length and the search area.

Alternatively, the pattern density is calculated by determining a ratio between the pattern boundary area and the search area.

Figure 6:
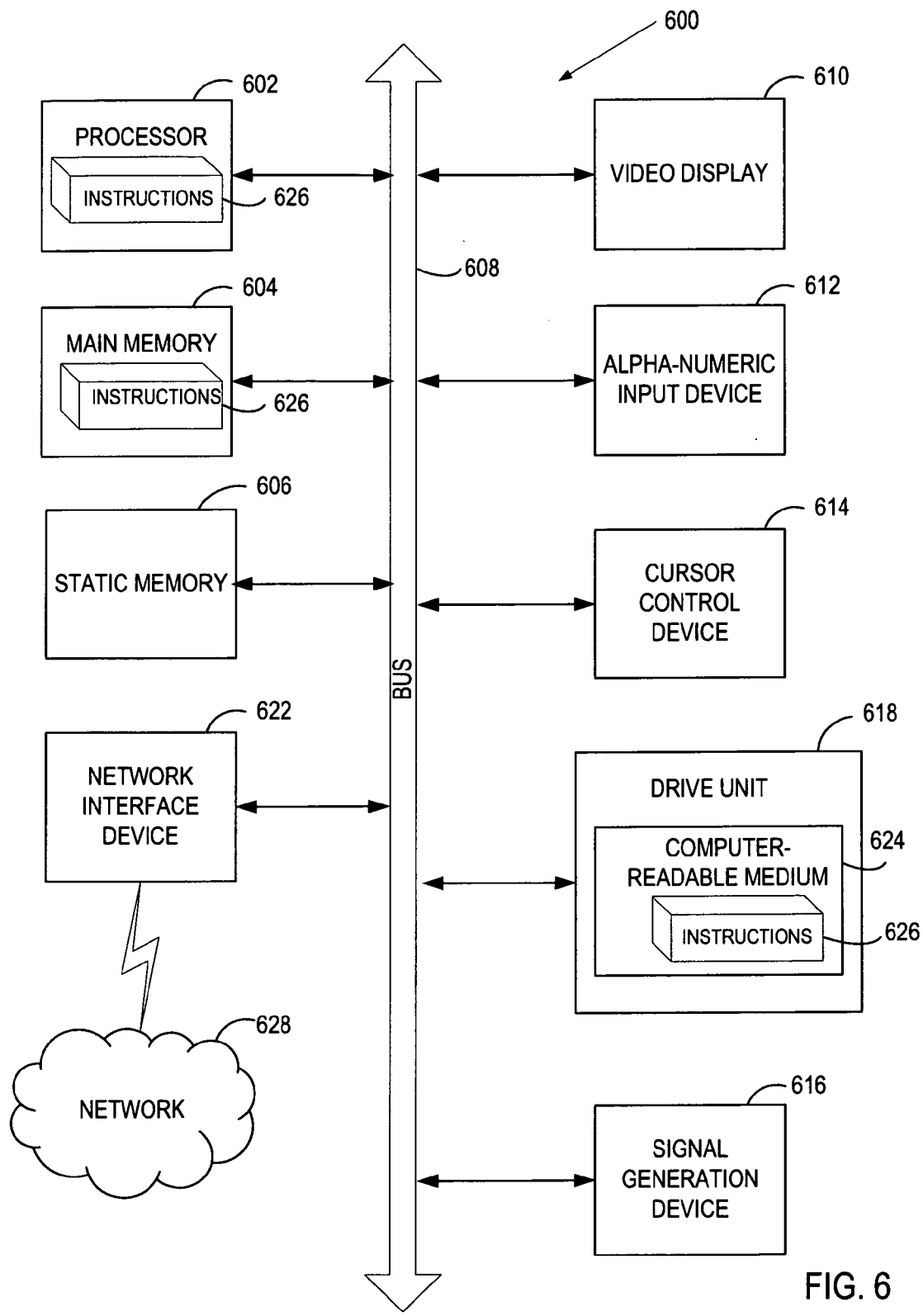
FIG. 6 illustrates an exemplary computer system, in accordance with one embodiment of the invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the processing logic 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 624 on which is stored one or more sets of instructions (e.g., software 626) embodying any one or more of the methodologies or functions described herein. The software 626 may also reside, completely or at least partially, within the main memory 604 and/or within the processor 602 during execution thereof by the computer system 600, the main memory 604 and the processor 502 also constituting machine-accessible storage media. The software 522 may further be transmitted or received over a network 628 via the network interface device 622.

The machine-accessible storage medium 624 may also be used to store data structure sets that define user identifying states and user preferences that define user profiles. Data structure sets and user profiles may also be stored in other sections of computer system 600, such as static memory 606.

While the machine-accessible storage medium 624 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
    storing defectivity data identifying one or more defects associated with one or more previous wafer designs in memory, wherein the defectivity data comprises data gathered from inspections performed on wafers having the previous wafer designs;
    dividing the defects associated with one or more design elements of the previous wafer designs into systematic defects and random defects;
    for each design layout of a new wafer design, predicting a yield separately for systematic defects and random defects associated with the new wafer design using the defectivity data associated with the previous wafer designs, wherein the new wafer design has no inspection and metrology data gathered; and
    calculating a combined yield based on the yield predicted for the systematic defects and the yield predicted for the random defects.

2. The computer-implemented method of claim 1, wherein predicting the yield for systematic defects comprises:
    applying, for each design layout of a new design, systematic defects from the one or more previous designs to the new design layout;
    associating each of systematic defects of the one or more previous designs with a calculated yield impact;
    applying the yield impact to the design elements of the new design layout,
    determining a yield loss for each of the design elements using the yield impacts, and
    combining the yield losses to determine a total yield loss for the new design layout.

3. The computer-implemented method of claim 2, wherein applying systematic defects from the one or more previous designs to the new design layout comprises:
    identifying systematic defects in one or more previous designs;
    searching the new design layout for the identified systematic defects; and
    applying a failure rate associated with the identified systematic defects to the new design layout.

4. The computer-implemented method of claim 1, wherein predicting the yield for random defects of the new design layout comprises for each critical layer:

applying random defect distribution information for each design element in the one or more previous designs corresponding to the design elements in the new design;

performing a simulation using the defect distribution information applied to the new design layouts to generate, for each design element, virtual defects on the new design;

calculating a CF value for the virtual defects, using geometric characteristics of the virtual defects;

applying the CF values of the virtual defects to yield correlation curves imported from previous designs, wherein the yield correlation curves correlate yield impact to the CF values; and combining the yield impact of each of the virtual defects.

5. The computer-implemented method of claim 4, wherein the random defect distribution information is received from at least one of: an inspection and metrology data database, and a design data database.

6. The computer-implemented method of claim 4, wherein the simulation is a Monte Carlo simulation.

7. The computer-implemented method of claim 1, wherein the systematic defect information and the random defect information is stored in at least one of: a design data database, and an inspection and metrology data database.

8. A computer-implemented system comprising:

memory to store design data for previous wafer designs and new wafer designs, wherein the design data comprises at least one of: wafer design layouts, and routing information for the wafer design layouts;

memory to store defectivity information associated with the previous wafer designs, wherein the defectivity data comprises data gathered from inspections performed on wafers having the previous wafer designs; and a design-stage yield analyzer, coupled to the memory to identify a new wafer design, wherein the new wafer design has no inspection and metrology data gathered, to identify defects on the new wafer design using the defectivity information associated with the previous wafer designs, and to predict yield for each wafer design layout for the new wafer design.

9. The computer-implemented system of claim 8, wherein the defect information associated with previous designs include at least one of: a size of the defects, a volume of the defects, and a location of the defects within the previous designs.

10. The computer-implemented system of claim 8, further comprising a report generator to generate a report specifying an optimal design layout for a new design.

11. The computer-implemented system of claim 8, wherein the design stage yield-analyzer comprises:

a design element identifier to divide previous layouts into design elements and to determine a design/defect interaction for a design element, wherein the design/defect interaction in relation to specify defects likely to occur for a specific design element;

a criticality factor calculator to calculate a criticality factor (CF) of individual defects; and a yield predictor to predict yield for each new design layout using the design/defect interaction associated with the design elements.

12. The computer-implemented system of claim 11, wherein the design elements are to be defined by at least one of: a line density and a component density.

13. The computer-implemented system of claim 11, wherein the design element identifier further comprises a pattern density calculator to calculate a pattern density of the design elements using geometric characteristics of the defects and design data obtained from the design data database.

14. The computer-implemented system of claim 11, wherein the design element identifier is to receive at least one of: pattern density, and design/defect interaction information for previous designs from at least one of: an inspection and metrology data database, and a pattern density reporter.

15. The computer-implemented system of claim 11, wherein the yield predictor predicts yield for each new design layout by:

dividing the defects into systematic defects and random defects;

for each design layout of a new design, predicting yield separately for the systematic defects and the random defects; and calculating a combined yield based on the yield predicted for the systematic defects and the yield predicted for the random defects.

16. The computer-implemented system of claim 15, wherein the yield predictor is to predict yield for random defects based on the criticality factor (CF) of individual defects calculated by the CF calculator.

17. The computer-implemented system of claim 16, wherein the CF calculator is to calculate a criticality factor (CF) of individual defects based on a size or a volume of the defect, and the layout of the design element on which the defect is found.

18. A computer-implemented apparatus comprising:

means for storing defectivity data identifying one or more defects associated with one or more previous wafer designs, wherein the defectivity data comprises data gathered from inspections performed on wafers having the previous wafer designs;

means for dividing the defects associated with one or more design elements of the previous wafer designs into systematic defects and random defects;

for each design layout of a new wafer design, means for predicting a yield separately for systematic defects and random defects associated with the new wafer design using the defectivity data associated with the previous wafer designs, wherein the new wafer design has no inspection and metrology data gathered; and means for calculating a combined yield based on the yield predicted for the systematic defects and the yield predicted for the random defects.

19. A non-transitory computer readable storage medium, comprising executable instructions which when executed on a processing system cause the processing system to perform a method comprising:

storing defectivity data identifying one or more defects associated with one or more previous wafer designs in memory, wherein the defectivity data comprises data gathered from inspections performed on wafers having the previous wafer designs;

dividing the defects associated with one or more design elements of the previous wafer designs into systematic defects and random defects;

for each design layout of a new wafer design, predicting a yield separately for systematic defects and random defects associated with the new wafer design using the defectivity data associated with the previous wafer designs, wherein the new wafer design has no inspection and metrology data gathered; and calculating a combined yield based on the yield predicted for the systematic defects and the yield predicted for the random defects.

20. The non-transitory computer readable storage medium of claim 19, wherein predicting the yield for systematic defects comprises:

applying, for each design layout of a new design, systematic defects from the one or more previous designs to the new design layout;

associating each of systematic defects of the one or more previous designs with a calculated yield impact;

applying the yield impact to the design elements of the new design layout, determining a yield loss for each of the design elements using the yield impacts, and combining the yield losses to determine a total yield loss for the new design layout.

21. The non-transitory computer readable storage medium of claim 19, wherein predicting the yield for random defects of the new design layout comprises for each critical layer:

applying random defect distribution information for each design element in the one or more previous designs corresponding to the design elements in the new design;

performing a simulation using the defect distribution information applied to the new design layouts to generate, for each design element, virtual defects on the new design;

calculating a CF value for the virtual defects, using geometric characteristics of the virtual defects;

applying the CF values of the virtual defects to yield correlation curves imported from previous designs, wherein the yield correlation curves correlate yield impact to the CF values; and combining the yield impact of each of the virtual defects.

\* \* \* \* \*